United States Patent [19]

Gaul et al.

[11] Patent Number: 4,904,290

[45] Date of Patent: Feb. 27, 1990

[54] COBALT BASED ALLOYS WITH CRITICAL CARBON CONTENT FOR MAKING AND USING IN GLASS FIBER PRODUCTION

[75] Inventors: David J. Gaul; Dennis L. McGarry, both of Granville, Ohio

[73] Assignee: Owens-Corning Fiberglas Corporation, Toledo, Ohio

[21] Appl. No.: 251,281

[22] Filed: Sep. 30, 1988

[51] Int. Cl.$^4$ .................. C03B 37/04; C03B 37/095
[52] U.S. Cl. .................................................. 65/1; 65/8; 65/15; 65/374.12; 420/436
[58] Field of Search ............. 65/1, 8, 15, 374.12; 420/436

[56] References Cited

U.S. PATENT DOCUMENTS

| | | | |
|---|---|---|---|
| 3,205,055 | 9/1965 | Laurent et al. | 65/374.12 X |
| 3,933,484 | 1/1976 | Costin | 75/171 |
| 3,980,473 | 9/1976 | Costin | 75/171 |
| 3,984,240 | 10/1976 | Costin | 75/171 |
| 4,353,742 | 10/1982 | Crook | 75/122 |
| 4,497,771 | 2/1985 | Spencer et al. | 420/440 |
| 4,618,474 | 10/1986 | Ohe et al. | 420/436 |
| 4,668,265 | 5/1987 | Gaul et al. | 65/8 |
| 4,668,266 | 5/1987 | Gaul | 65/8 |
| 4,761,169 | 8/1988 | Gaul | 65/8 |
| 4,765,817 | 8/1988 | Gaul | 65/8 |
| 4,767,432 | 8/1988 | Gaul | 65/8 |
| 4,820,324 | 4/1989 | Gaul | 65/8 |

Primary Examiner—Robert L. Lindsay
Attorney, Agent, or Firm—Patrick P. Pacella; Robert F. Rywalski

[57] ABSTRACT

Cobalt based alloys which include chromium, nickel, tungsten, tantalum, zirconium, carbon and boron are provided which are suitable for forming spinners to be used in forming glass fibers. The alloys contain critically important amounts of carbon which maximizes the stress rupture life of the spinner alloy and minimizes the creep rate thereby making the alloy outstandingly adapted for glass manufacture.

18 Claims, 4 Drawing Sheets

COBALT BASED ALLOYS WITH CRITICAL CARBON CONTENT FOR MAKING AND USING IN GLASS FIBER PRODUCTION

TECHNICAL FIELD

This invention relates to improved cobalt based alloys, and more particularly it relates to cobalt based alloys which are suitable for use as a spinner in the formation and attenuation of glass fibers. The invention also relates to articles which are formed by casting those alloys and the invention further relates to improved glass fiber forming methods employing such alloys as a spinner. Briefly, the alloys contemplated by this invention are cobalt based alloys and include chromium, nickel, tungsten (or wolfram), tantalum, zirconium, carbon, and boron. These alloys are essentially free of hafnium, yttrium and dysprosium. The alloys, of course, include incidental and unavoidable impurities.

BACKGROUND ART

In certain industrial applications there is a need for alloys which possess high rupture strength, high corrosion resistance, good oxidation resistance, low creep rates and high elongation to failure at elevated temperatures. Among such applications is the glass fiber industry where filaments are produced by passing molten glass material through the foraminous walls of a chamber which is adapted for rotation at high speeds. This chamber is generally known in the art as a spinner and the filaments are emitted through the fiberizing orifices in the walls due to the centrifugal action of the rotating spinner. Such spinners are typically operated at temperatures on the order of about 2050° F. and rotational speeds on the order of 2050 rpm.

It is advantageous from a production cost standpoint for the rotation speed of the spinner to be as high as possible so as to increase the rate at which filaments are emitted through the fiberizing orifices. However, high spinner rotational speeds result in reduction in spinner life due to the limited strength of the alloys. Additionally, it is necessary to have an alloy which has a low creep rate. If a suitable alloy were available, additional cost savings could be realized by fiberizing low cost batch formulations, such as higher viscosity glasses than that normally used to produce fibers for glass insulation (wool glass).

What is needed in the art is an alloy which has good glass corrosion and erosion resistance and one which has a maximized stress rupture life and a minimized creep rate, with acceptable elongation, under the conditions of use in the formation of glass fibers. Additionally there is a need for such alloys to be substantially free of such expensive constituents as yttrium, hafnium and dysprosium.

U.S. Pat. Nos. 3,933,484, 4,497,771, 4,668,265 and 4,668,266 disclose cobalt based alloys having many beneficial properties allowing them to be used as spinners in the formation and attenuation of glass fibers. Unfortunately, however, these patents do not describe, teach or suggest any techniques, formulations or relationships as to how one is to obtain an alloy having maximum values for properties which need to be high and minimum values for properties that need to be low. That is, there is nothing in these references suggesting a result effective variable for maximizing the stress rupture life while simultaneously minimizing the creep rate for a prescribed class of cobalt based alloys.

DISCLOSURE OF THE INVENTION

In accordance with the present invention an improved cobalt based alloy is provided which has good hot glass corrosion and erosion resistance, good high temperature oxidation resistance and a maximized stress rupture life and a minimized creep rate. In addition to having this fine balance of properties under spinner operating conditions, the alloys of this invention are not so brittle at room temperature that they cannot be machined and easily and expediently handled. These alloys are manufactured by conventional vacuum melting and vacuum investment casting to produce spinners of outstanding quality for use in the manufacture of glass fibers.

Most significantly the present invention is based on the unexpected and surprising discovery that the amount of carbon in the alloys is a result-effective variable in simultaneously maximizing the stress rupture life of the alloys and minimizing the creep rate of the alloys.

Thus in accordance with one feature of this invention there is provided a cobalt based alloy which consists essentially of the following constituents in approximate weight percent: chromium 33-40; nickel 5-15; tungsten (or wolfram) 5-10; tantalum 1.5-4; zirconium 0.01-0.5; carbon 0.75-1.3; boron 0.005-0.5; the balance cobalt. Quite desirably the carbon content will be about 0.8 to about 1.2 with an outstanding alloy having about 1% by weight carbon. While it will be found that alloys having the higher amounts of carbon, for example on the order of 1.2% or 1.3% by weight, have a fine balance of properties under the actual fiber forming conditions, such higher carbon contents result in the alloys being brittle at room temperature. Such room temperature brittleness obviously handicaps the ability to expediently handle castings and spinners and also handicaps the ability to machine such materials. Thus carbon contents below those values are desirable.

More specifically exemplary of an alloy as contemplated by the present invention, and one which will be illustrated further in the Examples, is an alloy consisting essentially of: about 36% by weight chromium; about 11% by weight nickel; about 6% by weight of tungsten: about 2.5% by weight of tantalum; about 0.2% by weight of zirconium; about 0.01% by weight of boron; and carbon between about 0.75% up to about 1.2 or 1.3% by weight, and the balance being cobalt. The alloys of the present invention can include incidental impurities, that is constituents which are not affirmatively and intentionally added to the formulation but whose presence is extremely difficult, if not impossible from a practical point of view, to avoid. Typical of such non-mandatory incidental impurities are one or more of the following in the amounts indicated: aluminum 0 to 0.2% by weight; titanium 0 to 0.2% by weight: manganese 0 to 0.05% by weight; molybdenum 0 to 0.1% by weight, iron 0 to about 1.5 or 2% by weight: phosphorus 0 to 0.005% by weight: sulfur 0 to about 0.005% by weight and silicon in an amount of 0 to about 0.2% by weight. The following impurities in order to obtain best results will be desirably limited to the maximum amounts indicated: bismuth up to 0.5 parts per million (PPM); lead up to about 5 PPM: selenium up to about 5 PPM: and silver up to about 50 PPM. Nitrogen ($N_2$) should generally be limited to an amount of about 150 PPM and oxygen ($O_2$) to an amount of about 50 PPM.

BRIEF DESCRIPTION OF THE DRAWINGS

The features and advantage uses of the present invention will become more clearly appreciated from the following description when taken in conjunction with the accompanying drawings in which.

DETAILED DESCRIPTION OF THE INVENTION INCLUDING THE BEST MODE OF CARRYING IT OUT

Figure 1:
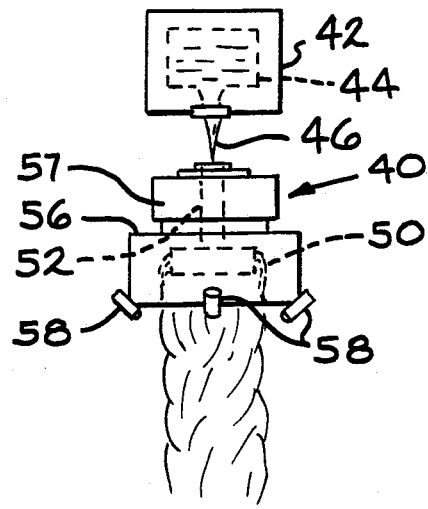
FIG. 1 is a semi-schematic, front elevational view of a rotary fiber forming system for producing glass fibers for insulation (wool) by employing a spinner.

Compositions of this invention can be prepared by vacuum induction melting and vacuum investment casting according to recognized procedures for cobalt based alloys, such as those known in the art as superalloys. In the preferred method of producing the alloys, the original melt formed in the crucible will consist principally of chromium and cobalt. Thereafter the remainder of the elements required can be introduced into the original melt in any order when the melt temperature is within the range of from about 2700° to about 2800° F. As an alternate less preferred technique, however, all components of the composition can be introduced into the crucible with the cobalt and chromium. Inasmuch as zirconium, boron and tantalum are in this composition it is preferred that they be introduced into the melt just shortly before pouring in order to prevent the oxidation of these materials and their loss from the crucible. After the addition of all the constituents, the melt is preferably heated to a temperature within the range of about 2800° F. to about 3025° F. to produce a uniform composition. The temperature of the melt is then reduced to 2600° F. to 2750° F. and poured into a heated investment mold employing conventional vacuum investment casting techniques. The mold is between 1500° F. and 1900° F. (The investment mold is produced by the lost wax process in which a wax pattern of the casting is invested in a series of ceramic slurries which are cured. The wax is removed in a steam autoclave and the finished mold is heated in a suitable high temperature furnace.) Preferably the resulting cast alloy is heat treated at 2000° F. for three hours and then air cooled. Of course, if desired, the alloy can first be formed into ingots which ingots can subsequently be melted in a vacuum induction furnace and vacuum investment cast.

For further details on vacuum investing casting, reference may be had to The Super Alloys by Sims & Hagel, John Wiley & Sons, Inc., 1972, pages 383-391 and 403-425.

A prior art alloy composition which has received extensive utilization is one containing about 31.2% by weight chromium, about 11.7% by weight nickel, about 7.4% by weight tungsten, about 1.8% by weight tantalum, about 0.025% by weight zirconium, about 0.63% by weight silicon, about 0.59% by weight carbon, about 0.038% by weight boron, iron in amounts of about 1 to about 1.5% with the balance being cobalt. Such alloy includes other incidental impurities which do not materially alter the properties of the alloy. With regard to such prior art alloy, which will hereinafter be referred to as the PA alloy, reference may also be had to the broad ranges disclosed in U.S. Pat. No. 3,933,484. Unlike the present invention wherein castings are made from alloys of the present invention by a vacuum investment casting process, castings of the PA alloy have been produced by an air melt process; such a process requires the presence of the high levels of silicon in the PA alloy to increase the fluidity of the melt. Fluidity is not a problem with the vacuum investment cast process and therefore the silicon content in the alloys of the present invention are low; in fact, except for being an incidental impurity, silicon would not need to be present at all in the present alloys. Furthermore, the use of a high silicon content alloy in vacuum investment casting processes should be avoided as castings formed by such a process are susceptible to a defect known as shrinkage porosity. The presence of high amounts of silicon in the alloys increases the freezing range of the alloys giving rise to casting integrity problems. One of the benefits of using a vacuum investment casting process, as contemplated for the alloys of the present invention, is the ability to produce near net shape castings. Consequently, unlike the PA alloy which contains a high silicon content, the alloys of the present invention are ideal for vacuum invest casting processes.

Vacuum melting and vacuum investment casting of the PA alloy may increase its strength, but generally will result in poorer creep resistance. Thus, for example, even if a good quality casting of the PA alloy is made by vacuum melting and a vacuum investment casting process, as opposed to the air melting and air casting process, an increase in rupture life cannot be taken advantage of, because of the concurrent detrimental increase in creep rate. Thus, for example at 2100° F. and 3000 psi, an air cast PA alloy may have a rupture life of 31 hours and a vacuum cast PA alloy may have a rupture life of 93 hours but the creep rate may typically change from $6.8 \times 10^{-4}$ inches/inches/hours for air casting to $3.7 \times 10^{-3}$ inches/inches/hours for investment cast. Thus such vacuum melting and vacuum investment casting may increase the stress rupture life but it also, unfortunately, increases the creep rate. This is in marked contrast to the present invention which provides for a maximized stress rupture life with a minimized creep rate.

The alloys of this invention are outstandingly adapted for use in the manufacture of spinners. These spinners then, in turn, because of their outstanding qualities, including high creep resistance and high stress rupture life, can be used to make glass fibers and especially in making glass fiber insulation (wool).

Figure 2:
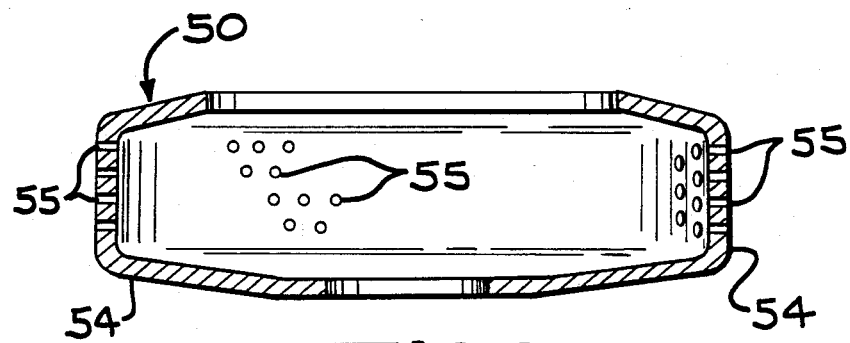
FIG. 2 is an enlarged cross-sectional view of a spinner of the type shown in FIG. 1.

Referring to FIGS. 1 and 2, in which like numerals represent like elements, there is shown a rotary or centrifugal glass fiber forming system including a rotor or spinner 50 fabricated of the alloy of this invention. As shown in FIG. 1, a rotary or centrifugal fiber forming system 40 is comprised of a flow means or channel 42 having a body of molten inorganic material 44, such as glass, therein. A stream of molten glass 46 is supplied to the rotor of spinner 50 from channel 42 in a manner well known in the art. Spinner 50 (shown in greater detail in FIG. 2), which is adapted to be rotated at high speeds, is comprised of a quill 52 and a circumferential stream-defining or working wall 54 having a plurality of orifices or apertures 55 therethrough. These orifices supply a plurality of pre-filament or primary stream of molten and inorganic material such as glass to be fiberized. A shroud 56 and circumferential blower or fluid attenuation means 57 are adapted to assist in the attenuation of the streams of molten material into fibers or filaments. A binder material or coating may be applied to the fibers by means of binder applicators 58 as is well known in the art. The thus formed fibers are then collected as a pack or mat to produce glass fiber insulation, commonly referred to as wool insulation.

The mechanical performance of the alloys of the present invention may be further enhanced by subjecting these alloys to a heat treatment which solutions the cast carbide structure and then precipitates a high fraction of MC carbides and produces a fine dispersion of $M_{23}C_6$ carbides (an approximate composition of the carbide is $Cr_{21}W_2C_6$. The MC carbides and the fine dispersion of $M_{23}C_6$ carbides substantially increases the rupture life of the alloys. Such a solution heat treatment may, for example, comprise heating to 2300° F. for four hours, air cooling, heating at 1700° F. for sixteen hours and air cooling. One cannot solution and age heat treat the PA alloy in view of the high silicon content which, as stated above, increases the freezing range. This in effect lowers the incipient melting point such that any temperature necessary to solution the carbides is above the incipient melting point. Silicon partitions to the $M_{23}C_6$ carbides in such fashion that it effects the composition and morphology. When high silicon content alloys are heat treated at solution temperature the $M_{23}C_6$ carbides are rapidly ripened giving rise to a strength reduction. For example the PA alloy when subjected to a solution heat treatment results in the stress rupture life dropping from 31 hours to about 8 hours (at 2100° F. and 3000 psi). Solution heat treatment of the present inventive alloys does not deteriorate its properties and it will be consequently appreciated that the PA alloy has properties which are significantly different from the present alloys.

The following will demonstrate the criticality of the carbon content and will show that in the critical carbon content range, stress rupture life is maximized while simultaneously obtaining a highly desirable minimized creep rate while there is no significant adverse impact with regard to the strain, that is elongation failure for these compositions.

The compositions which were employed generally had the following calculated target values: about 36% by weight chromium; about 8% by weight nickel; about 7% by weight tungsten; about 3.5% by weight tantalum; about 0.4% by weight zirconium; and about 0.01% by weight borm. Seven groups of six samples were manufactured in which the targeted carbon contents were respectively about 0.4%, 0.55%, 0.8%, 1%, 1.2%, 1.6%, and 2.0%. The cobalt balance for each of the seven samples was varied to accommodate the difference in carbon content. Actual analysis showed the following approximate ranges for Cr, Ni, W, Ta, and Zr: 33.8%–37.7% Cr; 8.5%–8.8% Ni; 7%–7.5% W; 3.2%–3.8% Ta; 0.25%–0.5% Zr. Boron was not analyzed but, based on previous experience, actually would generally have been in the range of about 0.008 to about 0.012%. Carbon analysis showed values virtually identical to the target values. The samples included incidental impurities which as previously indicated do not materially alter the properties of the alloys. For example silicon was present in amounts of less than about 0.2% and most likely in an amount of about 0.06% or less and the iron would have been about 0.2% maximum. The samples were manufactured by the first vacuum melting the seven samples at a temperature of about 2700° F. and a vacuum of about $1 \times 10^{-3}$ Torr at which time they were then vacuum investment cast into a mold at 1500° F. Samples were heat treated forthree hours at 2000° F., machined and tested. The strength of the alloys were determined by standard stress rupture tests (American National Standards/ASTME-139-70-Reapproved 1978). In all instances the testing was done at 2100° F. at 4000 psi. Additionally glass corrosion resistance was tested in a standard manner and was shown to be satisfactory for the present inventive alloys.

Table I below shows the stress rupture life (in hours), the creep rate (inches/inch/hour) and the percent elongation to break. The values represent an average of six tests. Table I also shows data for the air melted and air cast PA alloy noted above. This alloy, like the other alloys in Table I, was heat treated at 2000° F. for three hours but none of the Table I alloys were solution heat treated in the manner previously noted.

TABLE I

| Batch | % C | Stress Rupture Life (hrs) | Creep Rate (in/in/hr) | % Elongation |
|---|---|---|---|---|
| 1 | 0.4 | 48 | $20 \times 10^{-4}$ | 14 |
| 2 | 0.55 | 30 | $20 \times 10^{-4}$ | 11.3 |
| 3 | 0.8 | 66 | $8.2 \times 10^{-4}$ | 7.4 |
| 4 | 1 | 74 | $10 \times 10^{-4}$ | 12 |
| 5 | 1.2 | 82 | $7.9 \times 10^{-4}$ | 10 |
| 6 | 1.6 | 44 | $10 \times 10^{-4}$ | 8 |
| 7 | 2.0 | 23 | $21 \times 10^{-4}$ | 9.3 |
| PA Alloy | 0.6 | 19 | $60 \times 10^{-4}$ | 6 |

Figure 3:
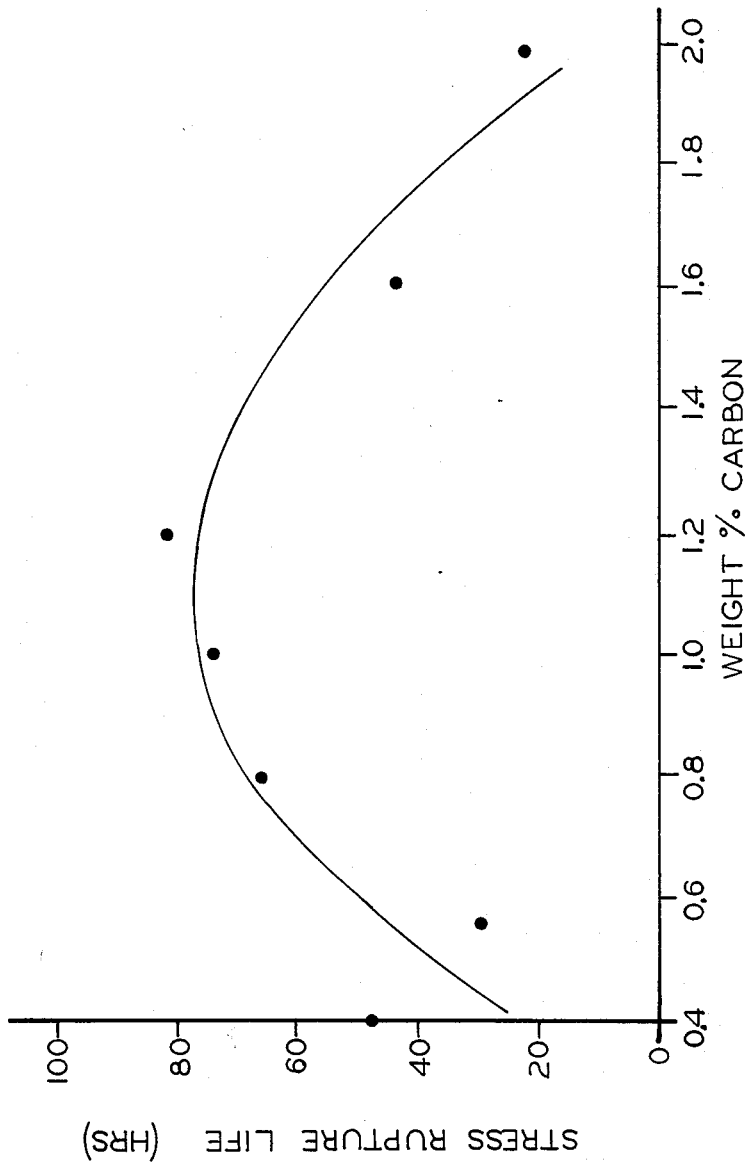
FIG. 3 is a graphic representation of the stress rupture life as a function of carbon content of an alloy of this invention.
Figure 4:
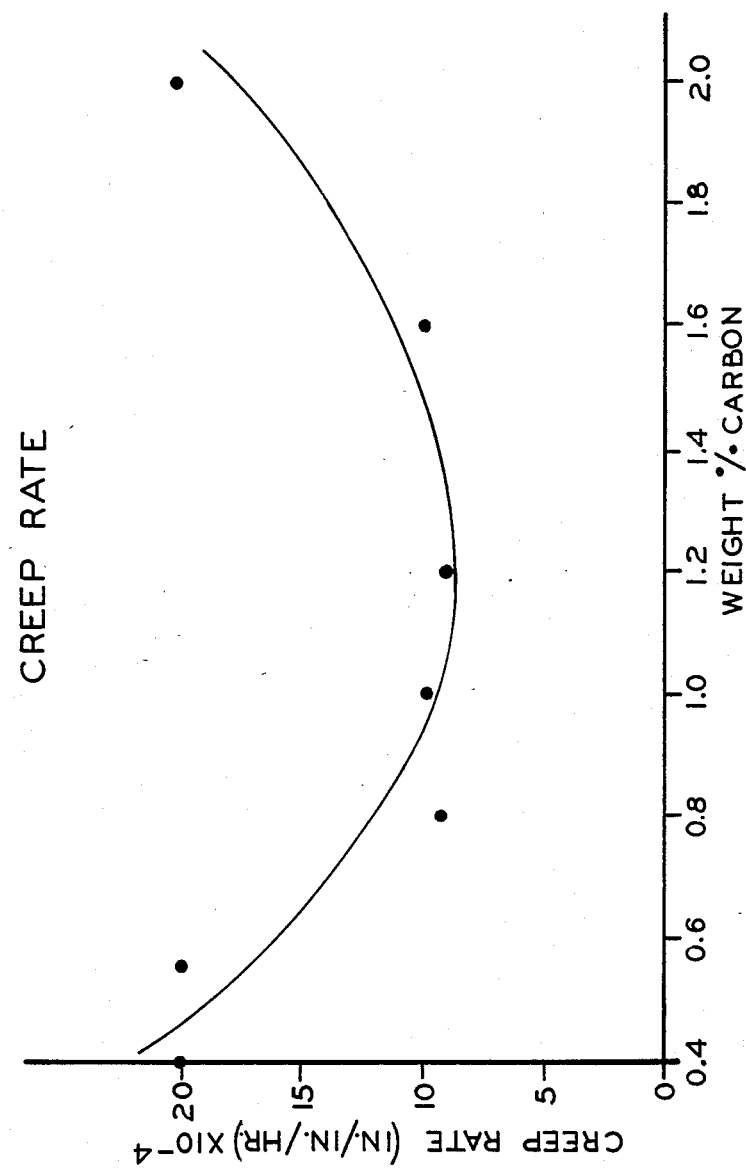
FIG. 4 is a graphic representation of the creep rate as a function of the carbon content of an alloy of this invention.
Figure 5:
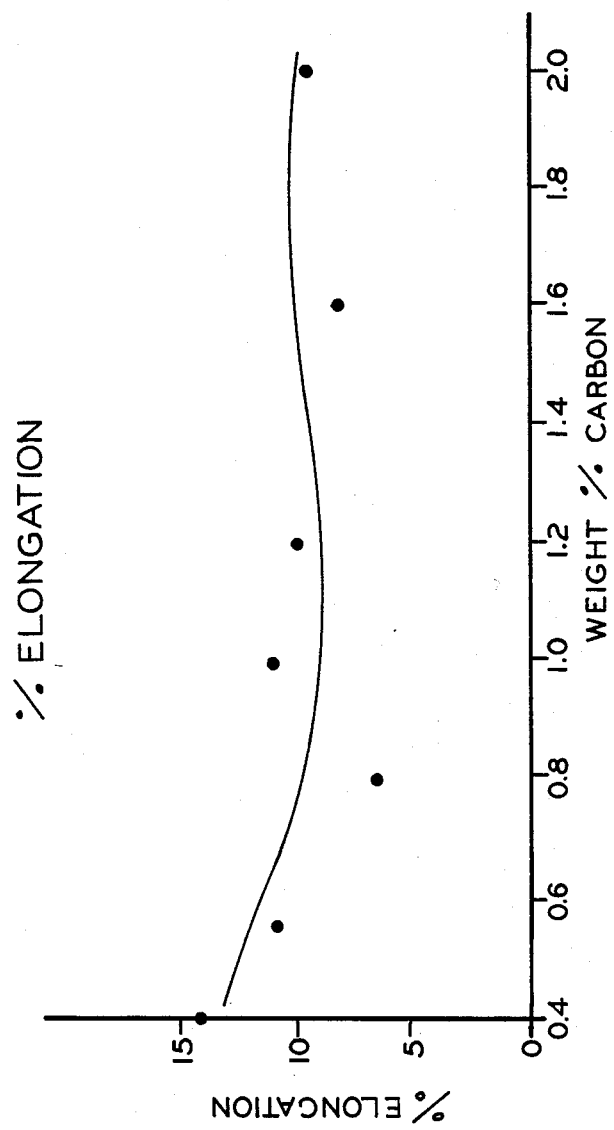
FIG. 5 is a graphic representation of the percent elongation, that is the elongation to failure, as a function of the carbon content of an alloy of this invention.

For convenience this data is graphically presented in FIGS. 3, 4 and 5 of the drawings. It will be observed that quite surprisingly with the variation in carbon over the ranges shown the stress rupture life, as seen in FIG. 3, shows a convex curve having a maximum value; in substantially the same carbon content range the concave curve for creep rate (FIG. 4) shows a minimum value. Since as indicated above it is important to have a maximum stress rupture life and a minimum creep rate, this surprising finding with respect to the criticality of carbon is quite significant. Additionally it will be observed in FIG. 5 that the benefit of the creep rate and stress rupture life can be realized in a carbon content range where there is substantially no penalty with regard to the elongation to break for the alloys. In observing FIGS. 3 and 4 it will be seen that there is essentially a maximum stress rupture life at about 1.2% by weight carbon and also nearly a minimum in the creep rate at 1.2% carbon. Generally it will be preferred, however, to have the carbon content less than about 1.2 or 1.3% by weight in order that the alloys can be more easily machined and handled at room temperature. That is, at those higher carbon content levels, the alloys become more brittle and greater care is required in their handling at room temperature notwithstanding that for example at 1.3% carbon the properties of the alloy are perfectly satisfactory for use under actual operating conditions. It will be apparent that by maintaining the carbon content in the proper range, improved results can be obtained with respect to creep rate and stress rupture life and it is not necessary to include in the alloys such expensive ingredients as hafnium, yttrium or even dysprosium.

Having described the invention it will of course be apparent that modifications are possible which pursuant to the patent statutes and laws do not depart from the spirit and scope thereof.

We claim:

1. As a composition of matter a glass corrosion resistant, high strength, low creep alloy which is free of hafnium and yttrium and dysprosium and which consists essentially of the following elements in approximate amounts expressed in weight percent

| | |
|---|---|
| chromium | 33% to 40% |
| nickel | 5% to 15% |
| tungsten | 5% to 10% |
| tantalum | 1.5% to 4% |
| zirconium | 0.01% to 0.5% |
| carbon | 0.75% to 1.3% |
| boron | 0.005% to 0.5% |
| cobalt | Balance | and optionally containing 0-0.2% by weight silicon and 0-2% by weight of iron and incidental impurities.

2. The composition of claim 1 wherein said carbon content is between about 0.8 to about 1.2%.

3. The composition of claim 2 wherein the carbon content is about 1% by weight.

4. The composition of claim 1 wherein the nickel content is about 8% to about 9%.

5. The composition of claim 1 wherein the chromium content is about 33.8% to about 37.7%, the nickel content is about 8.5% to about 8.8%, the tungsten content is about 7% to about 7.5%, the tantalum content is about 3.2% to about 3.8%, the zirconium content is about 0.25% to about 0.5%.

6. The composition of claim 5 wherein the boron content is about 0.008% to about 0.012%.

7. An article of manufacture produced by casting the composition of matter defined by claim 1.

8. An article of manufacture produced by casting the composition of matter defined by claim 2.

9. An article of manufacture produced by casting the composition of matter defined by claim 3.

10. An article of manufacture produced by casting the composition of matter defined by claim 5.

11. A spinner for forming glass fibers from molten glass comprising an apertured wall formed from the composition of claim 1.

12. A spinner for forming glass fibers from molten glass comprising an apertured wall formed from the composition of claim 2.

13. A spinner for forming glass fibers from molten glass comprising an apertured wall formed from the composition of claim 3.

14. A spinner for forming glass fibers from molten glass comprising an apertured wall formed from the composition of claim 5.

15. In a method of making mineral or glass fibers comprising passing molten material through a foraminous wall of a metal alloy spinner to form such fibers, the improvement wherein the spinner comprises the composition of claim 1.

16. In a method of making mineral or glass fibers comprising passing molten material through a foraminous wall of a metal alloy spinner to form such fibers, the improvement wherein the spinner comprises the composition of claim 2.

17. In a method of making mineral or glass fibers comprising passing molten material through a foraminous wall of a metal alloy spinner to form such fibers, the improvement wherein the spinner comprises the composition of claim 3.

18. In a method of making mineral or glass fibers comprising passing molten material through a foraminous wall of a metal alloy spinner to form such fibers, the improvement wherein the spinner comprises the composition of claim 5.

* * * * *